Figure 1:
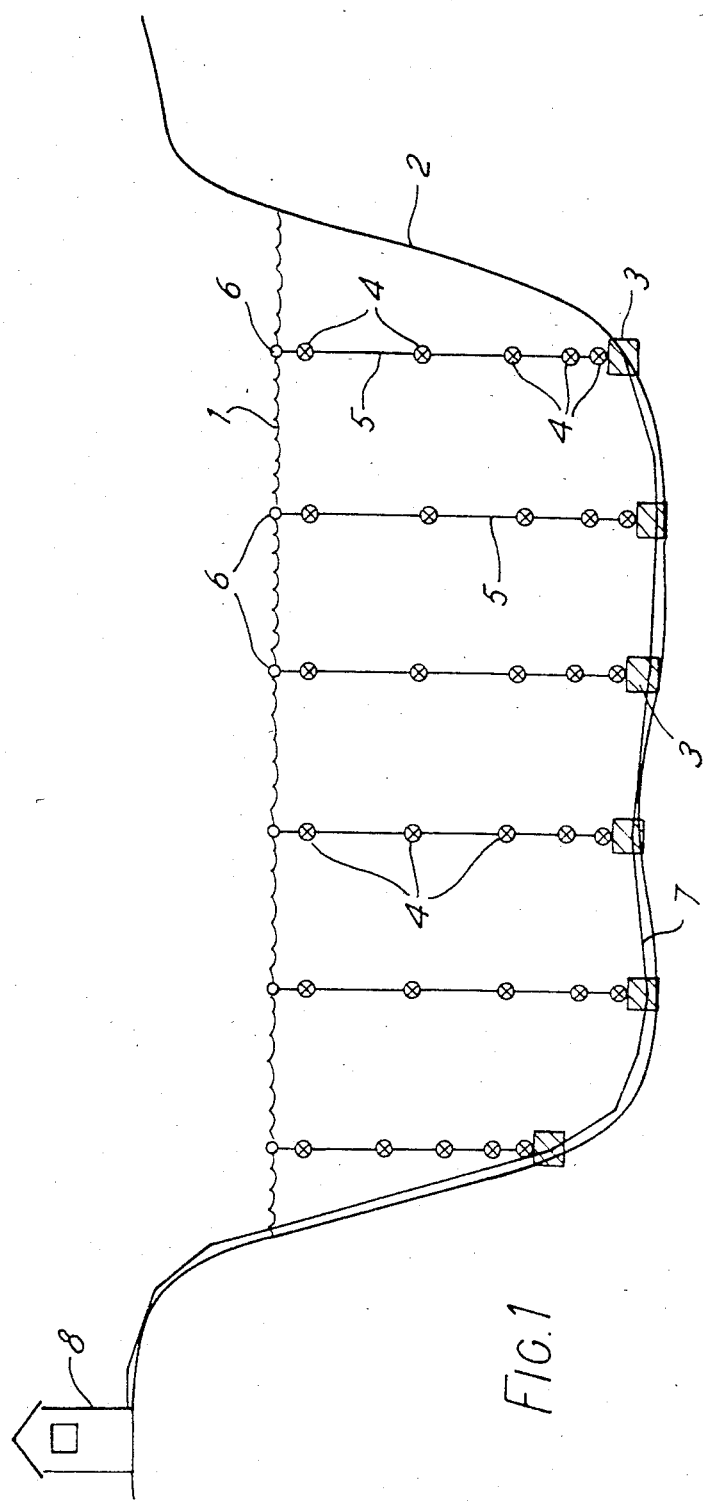

United States Patent [19]

Gavrilovic

[11] Patent Number: 4,593,561

[45] Date of Patent: Jun. 10, 1986

[54] FLUID PARAMETER MEASUREMENT SYSTEM

[76] Inventor: Alexander Gavrilovic, 44 Maunsell Way, Wroughton, Wiltshire SN4 9JE, United Kingdom

[21] Appl. No.: 641,760

[22] Filed: Aug. 17, 1984

[30] Foreign Application Priority Data

Aug. 18, 1983 [GB] United Kingdom ............... 8322320

[51] Int. Cl.[4] .......................... G01F 1/28; G01W 1/00
[52] U.S. Cl. .................................. 73/170 A; 73/188; 441/11
[58] Field of Search .............................. 73/170 A, 188

[56] References Cited

U.S. PATENT DOCUMENTS

| | | | |
|---|---|---|---|
| 3,706,225 | 12/1972 | Stimson | 73/189 |
| 4,307,605 | 12/1981 | Niskin | 73/188 X |

FOREIGN PATENT DOCUMENTS

| | | | |
|---|---|---|---|
| 0962029 | 2/1975 | Canada | 73/170 A |
| 0141511 | 5/1980 | Japan | 73/170 |
| 1248901 | 10/1971 | United Kingdom | 73/170 A |
| 2036333 | 6/1980 | United Kingdom | 73/170 A |
| 1574702 | 9/1980 | United Kingdom | 73/861.66 |
| 0958868 | 1/1981 | U.S.S.R. | 73/170 A |

OTHER PUBLICATIONS

"Current Measurement System for Ocean Engineering", G. A. Edgerton et al., Sep. 13-15, 1976, Oceans '76, Wash., DC USA, pp. (25A)-(1-7).

Primary Examiner—Daniel M. Yasich
Attorney, Agent, or Firm—Clifford A. Poff

[57] ABSTRACT

A measurement system for collecting data relating to the total, partial or distributed flow of a river or like course is disclosed. A generally planar array of flow velocity sensors is erected transversely with respect to the general direction of flow. The array comprises a number of vertically extending strings of sensors which are anchored at one end of the bed of the course and the free end of the string is supported by a buoyant float. The sensors in a string are attached at fixed intervals along the string so that each always resides at the corresponding fixed proportion of total depth up to the maximum which can be accommodated by the length of the string. Alternative sensor designs are also discussed.

12 Claims, 9 Drawing Figures

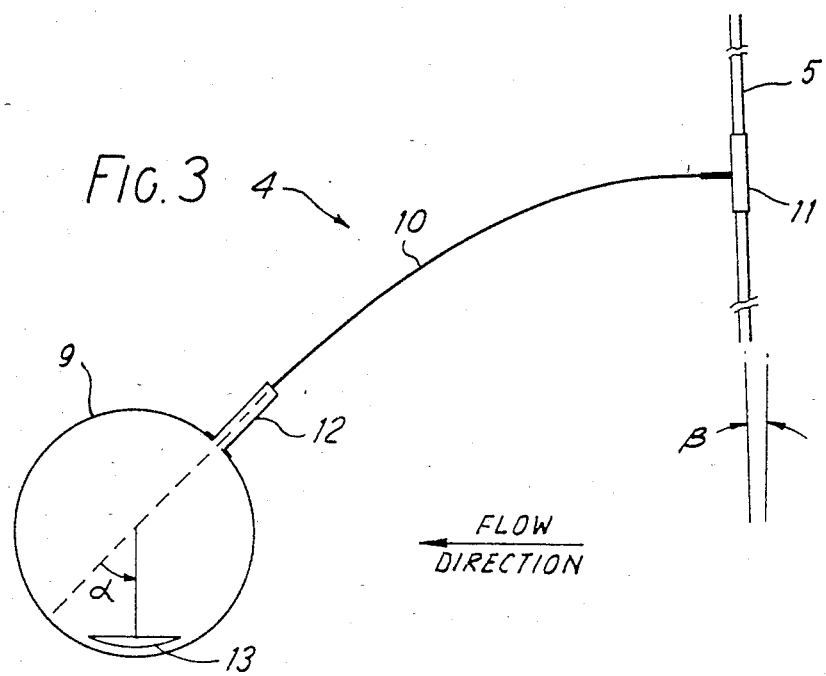
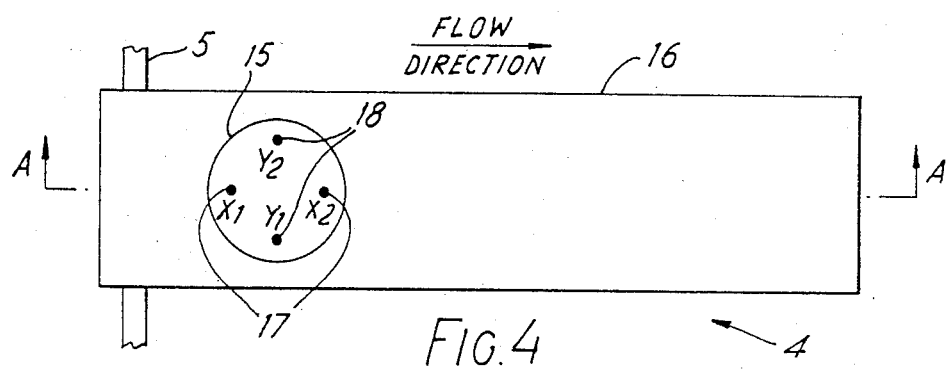
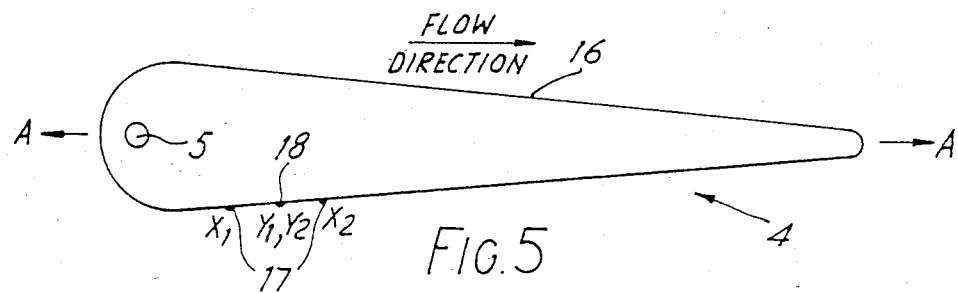

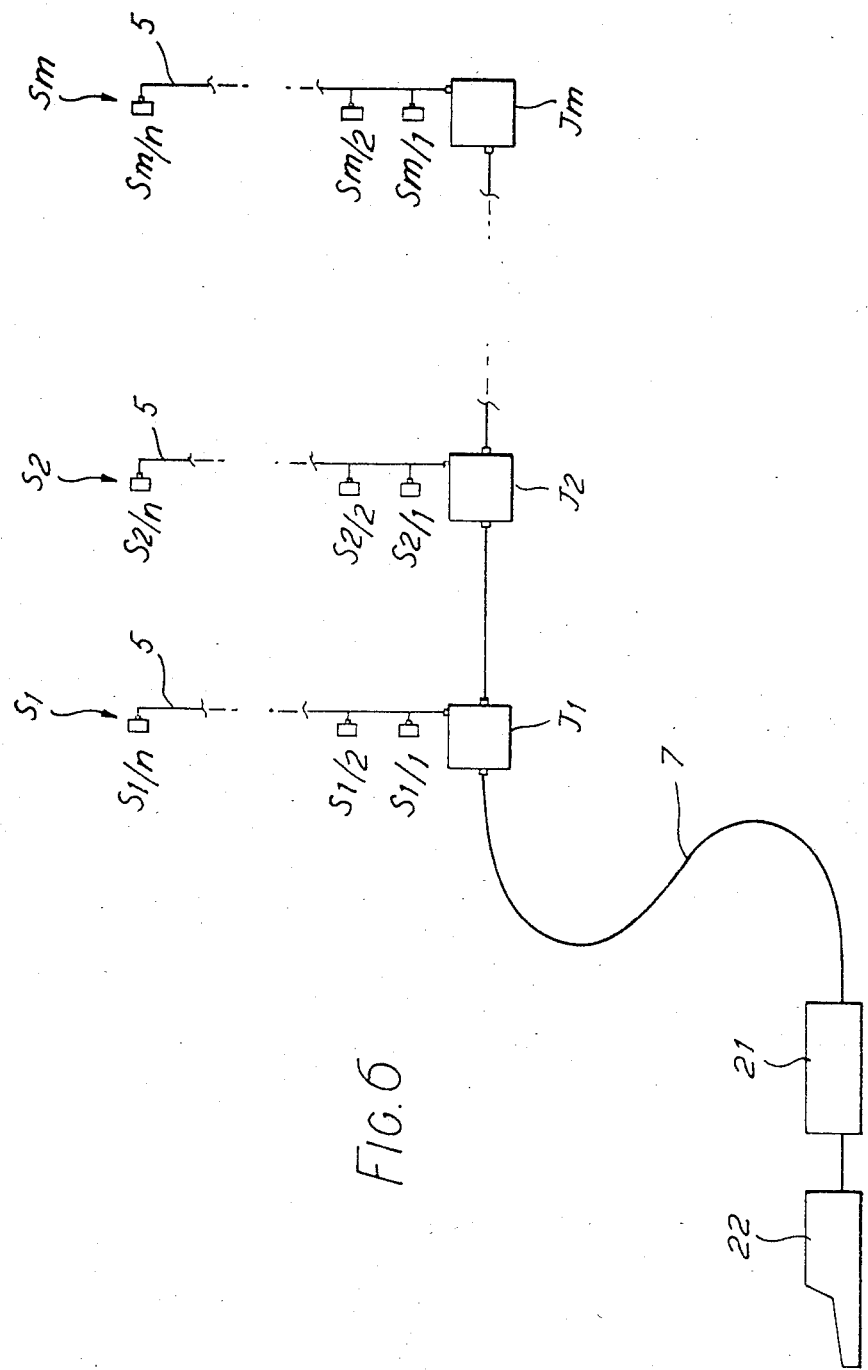

FLUID PARAMETER MEASUREMENT SYSTEM

The invention relates to a fluid parameter measurement system particularly for hydrodynamic measurements in both natural and artificial flows.

The measurement system of the present invention is useful for collecting data concerning several alternative variable parameters according to the type of sensor used, examples of such variables include: fluid flow velocity, water salinity, pH value, turbidity, concentration of solid sediments in suspension, water temperature, and water pressure. In particular, the invention is useful for measuring the distributed profile of the selected variable, say flow velocity, in small and large rivers as well as in lakes, estuaries, and off-shore environments.

A previous attempt to solve the problem of measuring a fluid flow rate profile in the restricted confines of a conduit is disclosed in GB No. 1,574,702, published Sept. 10, 1980. The system described uses, in one embodiment, a plurality of impact pressure and static pressure probes at transversely spaced points across a fluid flow conduit, and a plurality of transducers responsive to the pressure difference between the readings of the impact and static probes so that the transducers indicate the flow rate at each of the points. By this means an indication is obtained of the flow profile, or distribution of flow rates across the conduit. The array of probes and transducers is lowered into the fluid flow in the conduit when measurements are to be made.

This prior arrangement is designed specifically for use in the confines of a conduit and would appear totally unsuitable for use in large and open bodies of water such as rivers and estuaries as no means of accomodating substantial fluctuations in the depth of flow is provided so that the type of arrangement is unsuitable for use in tidal conditions or similar situations. Also such an arrangement cannot be used for measuring alternative parameters in the manner in which the present invention can.

It is an object of the present invention to provide a measurement system which avoids these drawbacks and is suitable for deployment in any of the previously described locations for the purpose of obtaining measurements of any of the mentioned properties of a fluid.

According to the invention there is provided a fluid parameter measurement system for use in a fluid course comprising at least one fluid parameter sensor buoyantly supported in the body of a fluid at a substantially constant proportion of the fluid depth.

In one form of the invention there may be a plurality of parameter sensors arranged in one or more strings extending in an upward direction from the bed of the course. The elongate supporting means may be supported at its distal end by a buoyant float.

A preferred form of the invention comprises a plurality of strings anchored at spaced intervals to the bed of the course, a plurality of sensors in each string buoyantly supported in the body of the fluid to form a substantially two dimensional sensor arrayed.

Figure 2:
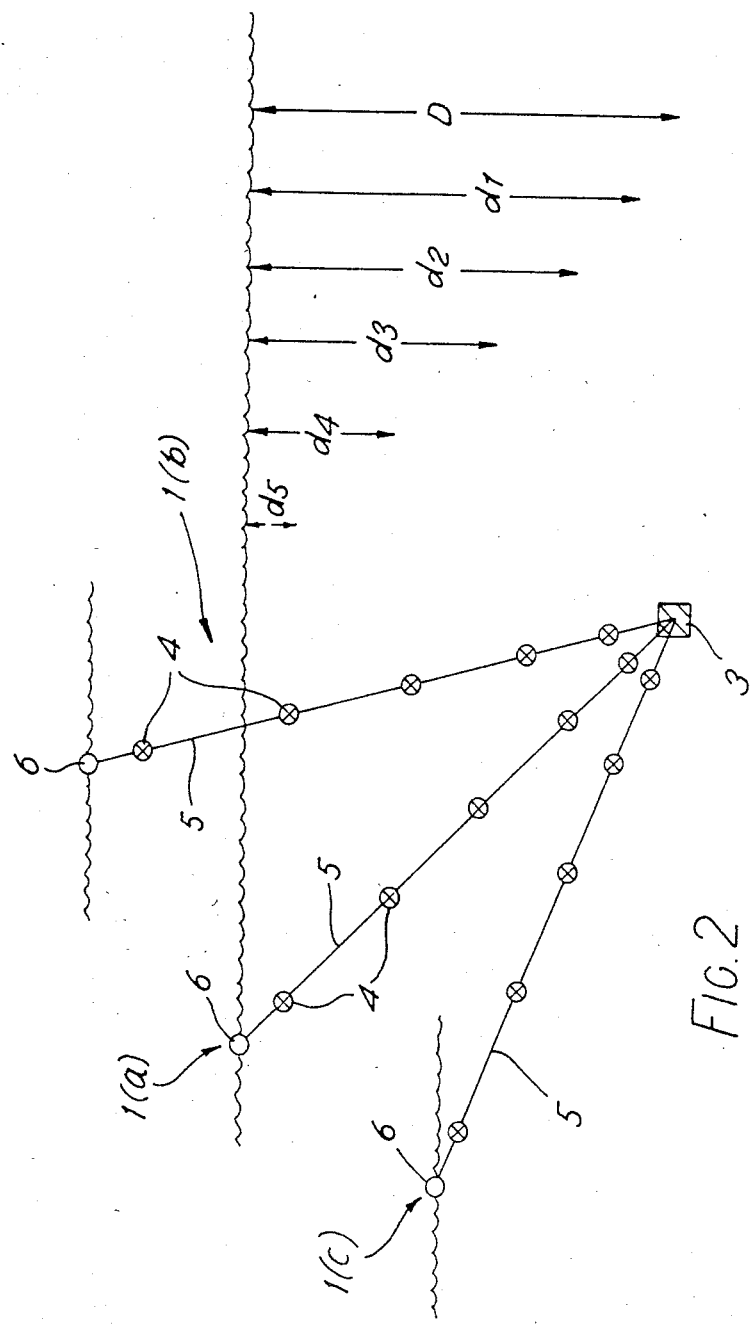
Figure 7A:
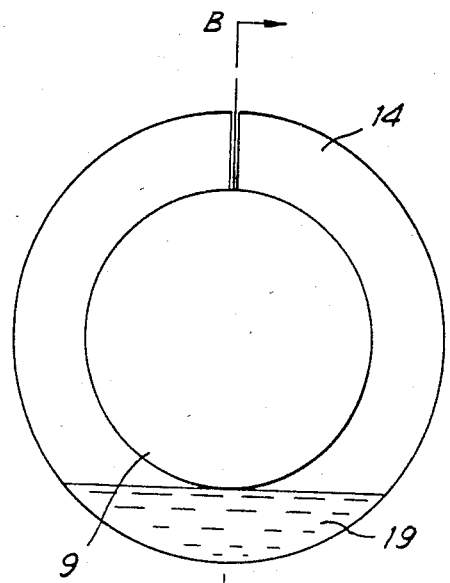
Figure 7B:
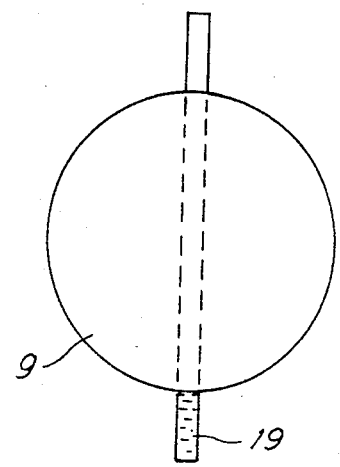
Figure 8:
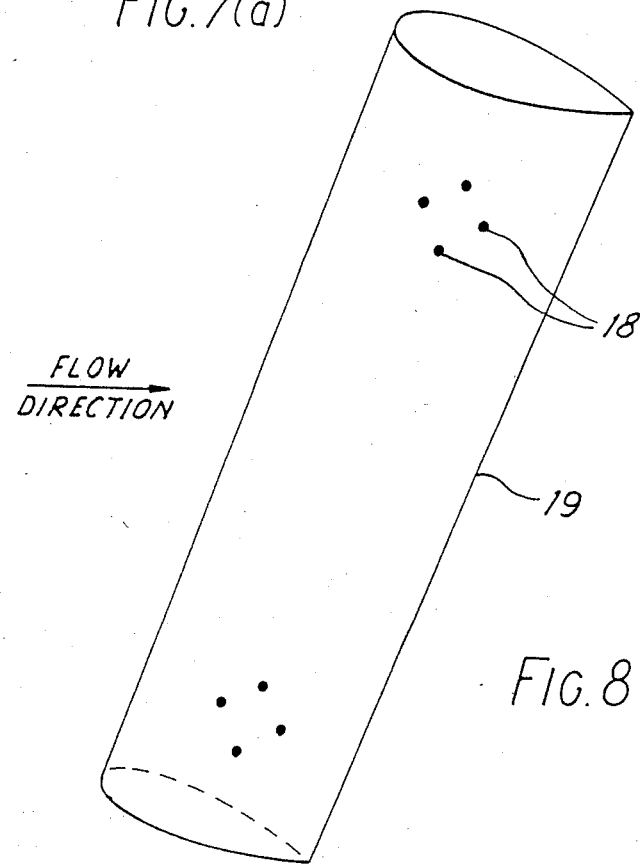

The invention and how it may be carried into practice will now be described, by way of example only, with reference to the accompanying drawings in which:

FIG. 1 shows a cross-section of a river installation of the flow measurement system, FIG. 2 shows a diagram of the behaviour of one string of sensors in varying depth of flow, FIG. 3 shows a schematic diagram of a double pendulum flow velocity sensor, FIG. 4 shows a schematic diagram of an electro-magnetic flow velocity sensor, FIG. 5 is a section on lined AA of FIG. 4, FIG. 6 is a block diagram of a data collection arrangement of the system of FIG. 1, FIGS. 7a and 7b are diagrams showing the sensor of FIG. 3 fitted with a stabilisation vane, and FIG. 8 shows a form of rigid sensor supporting means.

Referring now to the drawings FIG. 1 shows a measurement system of the invention in transverse view in a vertical plane through a river in which reference 1 indicates a typical water level and reference 2 the outline of the river bed. A plurality of anchor points 3 are located at positions across the full width of the river. Attached to each anchor point 3 there is a string of sensors for measuring a variable or parameter of the fluid, e.g. in one particular case the sensors comprise a plurality of individual flow velocity sensors 4 which are attached at fixed intervals spaced apart along the length of supporting means 5. This supporting means 5 is a taut but flexible cable alternatively a substantially rigid tubular structure of a plurality of jointed rods or tubes. The lower end of the strings, rod or cable 5 is attached to the anchor point 3 and the opposite distal end is secured to a buoyant float 6, the length of the rod or cable 5 is sufficient to ensure that float 6 remains on the surface of the river, at least under all normally expected flow conditions. The float 6 therefore also possesses sufficient buoyancy to support the sensor string.

The elongate supporting means may be alternatively a flexible cable, or a single elongate tubular member, one example of which is illustrated in FIG. 8, or again a series or chain of tubular members connected end to end. The single member is pivotally anchored to the bed at its proximal end in order accomodate the angular movement required as a result of varying fluid depths, and also tidal flow directions. The chain of tubular members is also pivotally anchored to the bed at its proximal end but, in addition, the connections between adjacent sections may also possess some freedom of movement.

The supporting means is provided with sufficient buoyancy either by means of a surface float, as at 6 in FIGS. 1 and 2, by inherent buoyancy of the supporting means, or by a combination of these features. For example, the tubular structures may comprise sealed hollow tubes so that, in water at least, the tubes tend to be inherently buoyant. It may be preferred, even if not strictly necessary to provide a substantial proportion of the required buoyancy, to retain a surface float merely or primarily as a marker indicating the existence of the submerged array of sensors.

Examples of suitable flow velocity sensors 4 will be described in greater detail below. Generally these and other types of sensor suitable for use in the presently described system include transducers which produce electrical output signals. These electrical output signals are carried by signal carrying means which extend in a downward direction to the anchor points 3 and there connect into a data highway 7 which joins all of the anchor points 3 to a data processing or data telemetry station 8 located on the river bank adjacent to the sensing array.

The data collection means referred to comprises appropriate scanning or multiplexing circuits in the station 8, the data highway 7 which comprises a multi-core cable connected between junction boxes in each of the anchor points 3 connecting them in series, and the electrical connections between these junction boxes and the individual sensors in each string of the array. Electrical power for the sensors is also supplied through this multi-core cable laid along the river bed. In general the submerged parts of the system contain the minimum amount of electronics necessary to allow the system to operate. Any form of data processing and computation is performed in the shore based station 8 or some other remote location in communication therewith.

FIG. 2, in which like parts have like references, shows the behaviour of one string of sensors in various depths of water flow in a river. In that part of the drawing indicated by reference 1(a) there is indicated the typical river level, at 1(b) there is indicated a high river level, and at 1(c) there is indicated at low river level. In each sensor string the sensors 4 are spaced apart along the length of the supporting means at fixed, but not necessarily equal intervals. Thus, irrespective of the inclination of the supporting means, providing the water level does not exceed the maximum design level of the measurement system, the relative spacing of the sensors referred to the depth of water remains constant. Since the length of a string of sensors is fixed, i.e. the distance between anchor points 3 and float 6, as the depth D or river flow varies then the horizontal separation of float 6 and anchor point 3, and therefore the inclination of the string 5 to the horizontal varies but the ratio of depth of each sensor, i.e. $d_1$, $d_2$, $d_3$, etc, relative to the overal depth D remains constant.

It follows from the above that the output signals of each sensor must be independent or self-compensating for the angle of inclination of the string 5. One such sensor for measuring water flow velocity is illustrated in FIG. 3 comprising a sensor of the double pendulum type. In this a body 9 is attached to the rod or cable 5 by means of a flexible cable or ligament 10 secured to the string 5 by a junction piece 11. The body 9 has a radial tube 12 to which the distal end of the cable 10 is secured. The body 9 being attached to the free distal end of cable 10 together constitute a first pendulum which is pivoted to the rod or cable 5 about the proximal end of the cable 10 at junction piece 11. Housed within the body 9 is a single of double axis inclinometer 13 which for example only constitutes a second pendulum arrangement which is pivoted about the centre of the body, or at least on a diameter lying on the axis of the radial tube 12.

The sensor operates to sense flow velocity as follows; the body 9 being immersed in a relatively moving fluid experiences an hydrodynamic drag force proportional to the square of the flow velocity acting in the direction of flow. The moving fluid will thus tend to carry the body downstream but since the sensor is restrained by anchorage via a vertical string to a fixed position on the bed the body 9 will move to a position at which the horizontal and vertical forces acting upon it are balanced.

The short radial tube 12 provides a fixed angular reference for the body 9 with respect to the flexible support 10 and this in turn is attached to the main rod or cable 5 by means of an appropriately angled junction piece 11. The length of the flexible support 10 is not critical subject to it being sufficiently long to allow the body 9 freedom of movement, in particular so that the inclination of the rod or cable 5 shall not influence the angular alignment of the body 9.

In operation, under zero flow conditions the support 10 and body 9 will hang in a vertical plane so that the angle of inclination a measured by inclinometer 13 is zero. In non-zero flow body 9 experiences hydrodynamic drag forces and is pulled downstream by these vector forces swinging on the end of support 10 through an angle in a vertical plane, the angle being determined by fluid velocity. Effectively this causes the body 9 to pivot through angle a about a horizontal axis lying transversely with respect to the direction of flow, notwithstanding that this movement is accompanied by some lateral displacement of body 9. The angle a is measured by the inclinometer and a correspondingly representative signal is generated. The inclinometer 13 thus measures only the orientation of the body 9 with respect to the vertical, or rest, or zero flow position.

An alternative flow velocity sensor illustrated in FIG. 4 utilises an electromagnetic flow sensing head 15 fitted into a housing 16 so shaped as to align its longitudinal axis AA parallel with the vertical plane through the direction of flow. The sensing head 15 is of a twin axis type having two orthogonal pairs of electrodes 17 and 18, and contains a coil which when energised with an electric current creates a magnetic field directed at right angles to the plane containing both pairs of electrodes 17 and 18. The fluid flowing past the surface of the sensing head 15 acts as a moving conductor and according to Faraday's law, induces an electro-motive force in each pair of electrodes proportional to the component of fluid velocity at right angles to that pair of electrodes and parallel to the plane of both pairs of electrodes. Thus the output signals from each pair of electrodes can be summed vectorially to yield a value proportional to the resultant flow velocity magnitude regardless of the vertical alignment of the string member 5.

If the string member 5 is a sufficiently flexible cable then each housing 16 in the s tring will align essentially independently with the direction of fluid flow even in circumstances where that direction varies with depth.

The tapering cross section of housing 16 about AA is illustrated diagrammatically in FIG. 5, the exact shape of which is to result in a stable alignment to the fluid flow direction free from any excessive hydrodynamic instability. The small angle between the plane of the electrodes 17 and 18 and the axis AA will affect the calibration factor for the electrical response of the sensor to flow velocity. This can be incorporated as part of the calibration relationship as it will be a constant factor over the working range of flow velocities. Alternatively the housing cross-section can be modified to reduce this factor to negligible proportions.

Referring now to FIG. 6 which shows the electronic/electrical data collection arrangements of the system in greater detail. The array of flow sensors is organised into m strings of sensors each of which comprises n individual sensors. Note that m could be as little as 1 and that n need not be the same for every string. In the diagram the first string of sensors all carry the reference S1, the next string S2, and so on up to the last string referenced Sm; and within each string the sensors are referenced 1 to n in order of decreasing depth below the surface. As previously mentioned the strings of sensors are anchored to the river bed at anchor points which are spaced apart, each anchor point including a junction unit, referenced J1, J2 - Jm, which are all connected to a common data highway carried by cable 7 to a shore based data processing station comprising interface unit 21 and data processing computer 22.

The measurement system may include a depth measuring gauge (not shown) or other measuring instrument which may also be connected into the data collection means described above through an additional junction unit (also not shown) positioned at any convenient point on the cable 7. This cable 7 may also carry a power supply to the junction units which in turn may supply power up the string, rod or cable to each of the sensors.

In the system being described data is collected from the data sources, i.e. flow velocity sensors, by a multiplexing or scanning arrangement in which each source can be interrogated in turn. In one particular system each junction unit has an address code and each sensor has an address code, the data signals transmitted along the data highway are generally in digital format but the signals transmitted from the individual sensors to their respective junction unit may be either digital or analog as is most appropriate or convenient for the type of sensor used. If the sensors provide an analog output signal this is fed to the junction unit which therefore includes digitising circuits. The data collection means operates in cyclic arrangement in which each junction unit is selected in turn and while each unit is selected each sensor connected to it is interrogated. A complete data collection cycle can therefore be completed relatively quickly and a complete set of data samples presented to the data processing computer for evaluation in a very much shorter period of time than would be possible by conventional data collection techniques.

FIG. 7 illustrates the type of double pendulum sensor of FIG. 3 to which a stabilising fin 14 has also been fitted. FIGS. 7(a) and (b) show two views of the sensor body 9 take at right angles in (a) with the fin 14 in the plane of the drawings and in (b) the fin at right angles to the plane of the drawing. In this arrangement the stabilising fin 14 will substantially reduce any tendency of the body 9 to oscillate about an axis through and parallel to the radial axis 12 of FIG. 3. A ballast weight 19 is incorporated into the lower end of the stabilising fin 14 to ensure that the latter is aligned in the vertical plane.

FIG. 8 illustrates a further alternative construction of a sensor supporting means, employing sensors 18 of the electromagnetic type referred to in connection with FIGS. 4 and 5. The present drawing illustrates a view of a mid-section of a rigid type of support for a sensor string. This comprises an elongate tube 19 formed from non-metallic material oval in transverse section and sealed at both ends. The tube 19 is attached at its upper proximal end to a surface float. At the lower and proximal end the tube 19 is pivotally attached to the anchor point 3 for angular movement about an horizontal axis, to accommodate reversal of tidal flows, to permit rotation about a longitudinal axis of the tube 19.

I claim:

1. A fluid parameter measurement system for use in a fluid course comprising a plurality of elongated strings of sensors, each elongated string of sensors including a plurality of sensors spaced apart from another by a fixed interval along the length of the elongated string of sensors and attached thereto, the said string of sensors having a proximal end pivotally attached to an anchoring means on the bed of the course and having a distal end attached to a surface float means whereby each sensor is suspended at a constant proportion of fluid depth, and each of the plurality of strings of sensors is attached to a different one of a plurality of anchoring means, the said anchoring means being located on the bed of the course and spaced apart at fixed intervals in a direction which lies transversely with respect to a normal direction of fluid flow in the course, the arrangement being such that the plurality of sensors lies in a plane extending transversely of the direction of normal fluid flow, thus forming a two-dimensional sensor array for measuring the fluid parameters.

2. The measurement system according to claim 1 wherein each of the string of sensors comprises a flexible cable pivotally anchored to the bed of the course for movement in at least a vertical plane containing the direction of fluid flow.

3. The measurement system according to claim 1 wherein each of the string of sensors comprises tubular means pivotally anchored to the bed of the course for movement in at least a vertical plane containing the direction of flow.

4. The measurement system as claimed in claim 3 wherein the tubular member embodies an aerofoil cross section.

5. The measurement system as claimed in claim 4 wherein said tubular member includes electromagnetic sensing means housed in non-metallic material.

6. The measurement system according to claim 1 wherein the output of each sensor is scanned in turn and wherein said measuring system further includes remote data processing means outside the body of the fluid for receiving the scanned output of the sensors.

7. The measurement system according to claim 6 further including communication means for carrying the output of each sensor, the communication means extending from a sensor to the bed of the course and thence to said data processing means.

8. The measurement system as claimed in claim 7 wherein said communication means includes multiplex data collection means.

9. The measurement system as claimed in claim 1 wherein said sensors include a sensor having a body flexibly suspended from a support means such that the angle of orientation of said body with respect to a reference in a vertical plane is determined by vector forces produced by fluid flow for indicating the velocity of the fluid flow, said measuring system further including means in the body of the sensor for sensing said angle to indicate flow velocity in the region of said body.

10. The measurement system as claimed in claim 9 wherein said means in the body of the sensor for sensing the angle of the body comprises an inclinometer.

11. The measurement system as claimed in claim 9 wherein said body of the sensor comprises a first pendulum rigidly attached to the distal end of a flexible ligament suspending the body from the anchored supporting means, a second pendulum mounted for angular movement about a horizontal axis with respect to the first pendulum, and means responsive to said angular movement for indicating the fluid flow velocity.

12. A two-dimensional fluid parameter measurement system for use in a fluid course, said system including a plurality of elongated strings of sensors, each elongated string of sensors including a plurality of sensors spaced apart from one another at fixed intervals along the length of an elongated support means and attached thereto for measuring fluid parameters in a first direction, and anchor means for retaining the proximal end of each elongated support means on the bed of the course, said support means having a distal end attached to a surface float means for suspending the sensors attached to each string at a constant proportion of fluid depth, each of the plurality of strings of sensors being attached to a different one of a plurality of anchoring means, the said anchoring means being spaced apart at fixed intervals on the bed of the course in a direction which lies transversely with respect to a normal direction of fluid flow in the course such that the plurality of strings of sensors lies in a plane extending transversely of the direction of normal fluid flow for measuring fluid parameters in a second direction, whereby signal data from the strings of the sensors can be processed by a remote station.

* * * * *